United States Patent
May-Ling et al.

(10) Patent No.: US 11,795,774 B2
(45) Date of Patent: Oct. 24, 2023

(54) SEALING PROFILE PROTECTOR

(71) Applicant: FMC Technologies, Inc., Houston, TX (US)

(72) Inventors: Rachel Ho May-Ling, Singapore (SG); Ramu Valliappan Manickam, Singapore (SG); Paul L. Riley, Houston, TX (US)

(*) Notice: Subject to any disclaimer, the term of this patent is extended or adjusted under 35 U.S.C. 154(b) by 664 days.

(21) Appl. No.: 16/604,721

(22) PCT Filed: May 1, 2017

(86) PCT No.: PCT/US2017/030461
§ 371 (c)(1),
(2) Date: Oct. 11, 2019

(87) PCT Pub. No.: WO2018/203877
PCT Pub. Date: Nov. 8, 2018

(65) Prior Publication Data
US 2020/0378207 A1    Dec. 3, 2020

(51) Int. Cl.
*E21B 33/037* (2006.01)
*F16L 55/11* (2006.01)
*F16L 57/00* (2006.01)
*F16L 55/115* (2006.01)

(52) U.S. Cl.
CPC ........ *E21B 33/037* (2013.01); *F16L 55/1141* (2013.01); *F16L 57/005* (2013.01); *F16L 55/1157* (2013.01)

(58) Field of Classification Search
CPC ... E21B 33/037; F16L 55/1141; F16L 57/005; F16L 55/1157
See application file for complete search history.

(56) References Cited

U.S. PATENT DOCUMENTS

| | | | |
|---|---|---|---|
| 1,791,277 A | 2/1931 | Lake | |
| 2,196,454 A * | 4/1940 | Kahn | F16L 57/005 138/96 T |
| 3,038,502 A * | 6/1962 | Hauk | F16L 57/005 81/3.43 |
| 3,051,200 A | 8/1962 | Bevington | |
| 3,355,181 A | 11/1967 | Olson | |
| 3,486,759 A | 12/1969 | Lewis | |
| 3,784,214 A | 1/1974 | Tamplen | |
| 3,858,613 A * | 1/1975 | Musslewhite | B65D 59/06 138/96 T |
| 4,139,023 A * | 2/1979 | Turley | B65D 59/06 138/96 T |
| 4,582,090 A * | 4/1986 | Chase | E21B 17/006 138/96 T |

(Continued)

FOREIGN PATENT DOCUMENTS

DE     44 04 581 A1    8/1995
WO     WO 98/21508 A1  5/1998

*Primary Examiner* — Aaron L Lembo
(74) *Attorney, Agent, or Firm* — Henry C. Query, Jr.

(57) ABSTRACT

A sealing profile protector for a subsea hydrocarbon production or processing system component includes a body having an contact surface which is configured to engage a sealing profile on the component. When the sealing profile protector is installed, the contact surface displaces seawater from the sealing profile. In this manner, contaminants are inhibited from forming on the sealing surface after the sealing profile protector is installed.

22 Claims, 2 Drawing Sheets

(56) References Cited

U.S. PATENT DOCUMENTS

| | | | |
|---|---|---|---|
| 4,796,668 A * | 1/1989 | Depret | F16L 57/005 |
| | | | 138/96 T |
| 5,303,741 A | 4/1994 | Gauger | |
| 6,761,360 B2 | 7/2004 | Hammi | |
| 8,091,647 B2 | 1/2012 | Nicholson et al. | |
| 10,591,097 B2 * | 3/2020 | Nahrwold | F16L 23/18 |
| 11,215,021 B2 * | 1/2022 | Givens | E21B 33/1208 |
| 2005/0045240 A1 * | 3/2005 | Casteran | F16L 57/005 |
| | | | 138/96 T |
| 2005/0081933 A1 * | 4/2005 | Latiolais, Jr. | E21B 17/006 |
| | | | 138/96 T |
| 2005/0263296 A1 | 12/2005 | Moyes | |
| 2006/0042709 A1 * | 3/2006 | Takano | E21B 17/006 |
| | | | 138/96 T |
| 2009/0266551 A1 | 10/2009 | Cuiper et al. | |
| 2010/0108174 A1 * | 5/2010 | Qiao | E21B 17/006 |
| | | | 138/96 T |
| 2010/0194049 A1 | 8/2010 | Kocurek | |
| 2010/0206575 A1 | 8/2010 | Theiss et al. | |
| 2011/0084484 A1 * | 4/2011 | German | F16L 37/0845 |
| | | | 285/337 |
| 2012/0007314 A1 | 1/2012 | Nguyen et al. | |
| 2014/0352837 A1 * | 12/2014 | Yamamoto | F16L 57/005 |
| | | | 138/96 T |
| 2015/0083430 A1 | 3/2015 | Jahnke et al. | |
| 2017/0254156 A1 * | 9/2017 | Aguilar Mendez | E21B 17/042 |
| 2018/0274711 A1 * | 9/2018 | Aguilar Mendez | E21B 17/006 |
| 2021/0199232 A1 * | 7/2021 | Egger | B29C 45/2618 |
| 2021/0239254 A1 * | 8/2021 | Kroll | F16L 57/005 |

\* cited by examiner

SEALING PROFILE PROTECTOR

The present disclosure is directed to a subsea production, injection or processing system component which comprises a sealing profile. In particular, the disclosure is directed to a device for inhibiting contaminants such as marine growth and calcareous deposits from forming on the sealing profile when the component is submerged in seawater.

BACKGROUND OF THE INVENTION

Subsea production, injection and processing systems normally include a number of components which are sealed to each other in order to isolate the well bore from the subsea environment. For example, a typical subsea production system includes a wellhead which is positioned at the top of the well bore and a christmas tree which is connected to the top of the wellhead. The tree is sealed to the wellhead using a gasket or other sealing device which is configured to engage corresponding sealing profiles formed in the bottom of the tree and the top of the wellhead. Also, during certain operations a blowout preventer (BOP) may be connected to the top of the tree to maintain well control while also providing access to the well bore. Similar to the tree-to-wellhead interface, the BOP is sealed to the tree using a gasket or other sealing device which is configured to engage corresponding sealing profiles formed in the bottom of the BOP and the top of the tree.

During the production mode of operation, a debris cap or similar device is usually connected to the top of the tree to prevent debris from falling into the tree bore. However, the debris cap normally does not prevent seawater from contacting the sealing profile at the top of the tree. As a result, marine growth and calcareous deposits may form on this bare metal sealing profile. During the workover mode of operation, the debris cap is removed and the BOP is connected and sealed to the top of the tree. Prior to doing so, however, any marine growth and calcareous deposits on the sealing profile at the top of the tree must be removed so that the gasket will form an effective seal with the tree. This operation is usually performed by a remotely operated vehicle (ROV), but this task usually takes a relatively long time to complete.

In the prior art, protective covers and injection inhibitors (i.e., chemicals) are sometimes used to prevent the formation of marine growth and calcareous deposits on the sealing profile. However, these methods do not provide sufficient protection to the sealing surface over time without additional intervention. For example, injection inhibitors usually must be replenished from time to time, and protective covers usually do not prevent sea water from contacting the sealing profile.

SUMMARY OF THE INVENTION

In accordance with the present disclosure, a sealing profile protector for a sealing profile of a subsea system component is provided. The sealing profile protector includes a body which comprises a contact surface that is configured to engage the sealing profile; wherein when the sealing profile protector is installed, the contact surface displaces seawater from the sealing profile; whereby contaminants are inhibited from forming on the sealing surface after the sealing profile protector is installed.

In accordance with one aspect of the disclosure, the contact surface may be configured to form an interference fit with the sealing profile.

In accordance with another aspect of the disclosure, the body may comprise a portion on which the contact surface is formed, and at least the portion of the body may be made of a compliant material. For example, the portion of the body may be made of an open cell silicone foam.

In accordance with a further aspect, the sealing profile may be formed proximate an upper end of the component and the body may be connected to or formed integrally with a cap member that is configured to be connected to the upper end of the component.

In accordance with another aspect of the disclosure, the contact surface may be configured to form an interference fit with the sealing profile.

In accordance with yet another aspect, the body may comprise a portion on which the contact surface is formed, and at least the portion of the body may be made of a compliant material. For example, the portion of the body may be made of an open cell silicone foam.

In accordance with yet another aspect of the disclosure, the sealing profile may be formed on a radially inner surface of the component and the contact surface may be formed on an outer circumference of the body.

In accordance with one aspect of the disclosure, the body may be connected to or formed integrally with a cap member which configured to be connected to an upper end of the component.

In accordance with another aspect of the disclosure, the contact surface may be configured to form an interference fit with the sealing profile.

In accordance with yet another aspect of the disclosure, the body may comprise a portion on which the contact surface is formed, and at least the portion of the body may be made of a compliant material. For example, the portion of the body may be made of an open cell silicone foam.

The present disclosure is also directed to a subsea system which comprises a component having an annular sealing profile, the sealing profile being formed on a radially inner surface portion of the component, and the radially inner surface portion being located proximate an end of the component. The subsea system also comprises a sealing profile protector which includes a circular body which comprises an annular contact surface that is configured to engage the sealing profile; wherein when the sealing profile protector is installed, the contact surface displaces seawater from the sealing profile; whereby contaminants are inhibited from forming on the sealing surface after the sealing profile protector is installed.

In accordance with one aspect of the disclosure, the body may comprise a ring-shaped configuration.

In accordance with another aspect of the disclosure, the body may be connected to or formed integrally with a cap member.

In accordance with yet another aspect, the contact surface may be configured to form an interference fit with the sealing profile.

In accordance with a further aspect of the disclosure, the body may comprise a portion on which the contact surface is formed, and at least the portion of the body may be made of a compliant material. For example, the portion of the body may be made of an open cell silicone foam.

The present disclosure is also directed to a method for protecting a sealing profile of a subsea production or processing system component from seawater. The method includes the steps of providing a sealing profile protector which comprises an annular contact surface that is configured to engage the sealing profile; and installing the sealing profile protector to thereby displace seawater from the sealing profile.

In accordance with one aspect of the disclosure, the sealing profile protector is connected to or formed integrally with a protective cover for the component and the installing step comprises mounting the protective cover on the component.

In accordance with another aspect of the disclosure, the sealing profile protector comprises a portion on which the contact surface is formed, and at least the portion is made of an open cell silicone foam.

Thus, the sealing profile protector functions to displace seawater from the sealing profile and thereby inhibit contaminants such as marine growth and calcareous deposits from forming on the sealing profile. In effect, the sealing profile protector disrupts the boundary between the seawater and the sealing surface and thereby prevents the marine growth and/or calcareous deposits from forming on the sealing profile. As a result, the sealing profile will not need to be cleaned, or will only require minimal cleaning, before the gasket is installed and another component is connected to the subsea production, injection or processing system component.

These and other objects and advantages of the present disclosure will be made apparent from the following detailed description, with reference to the accompanying drawings. In the drawings, the same reference numbers may be used to denote similar components in the various embodiments.

DETAILED DESCRIPTION OF THE INVENTION

The sealing profile protector disclosed herein is designed to prevent contaminants, such as marine growth and calcareous deposits, from forming on the sealing profile of a subsea production, injection or processing system component which is submerged in seawater. The component can be virtually any component which comprises a sealing profile and/or a critical area that is configured to be sealingly engaged by a gasket or similar sealing device to thereby seal the component to another subsea production, injection or processing system component. Examples of such components include but are not limited to wellheads, tubing heads and christmas trees. For purposes of the present disclosure, the term sealing profile should be interpreted to encompass any critical area of a component that is configured to be sealingly engaged by a gasket or similar sealing device.

Figure 1:
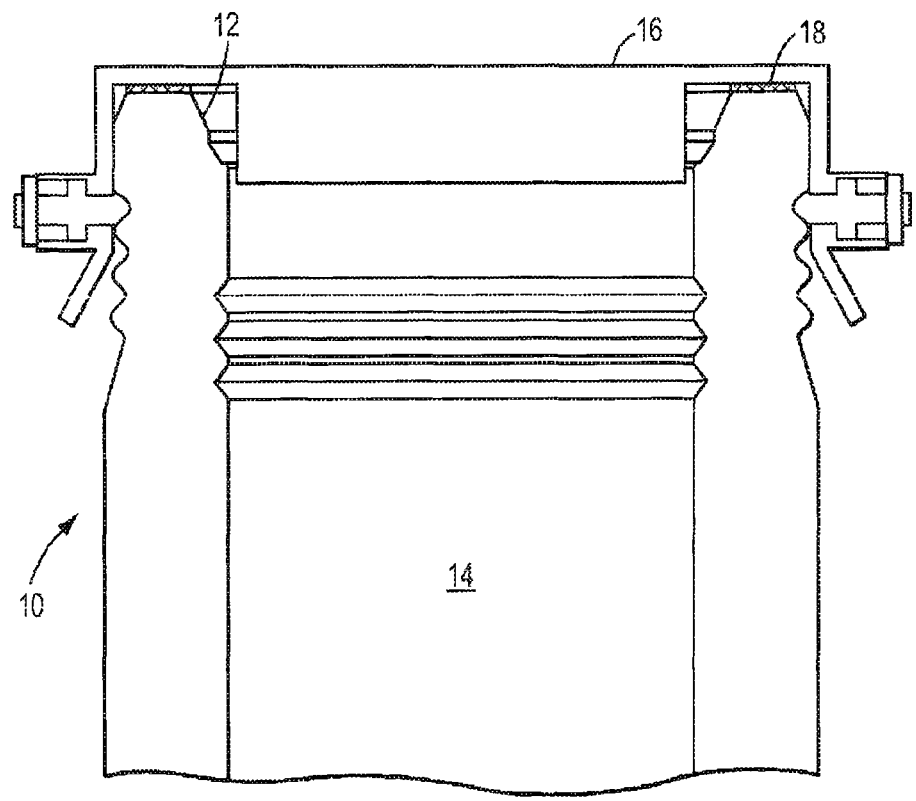
FIG. 1 is a cross sectional view of the upper portion of an illustrative christmas tree with a representative protective cover connected to the top thereof.

Referring to FIG. 1, for example, a christmas tree, generally 10, is shown to comprise a sealing profile 12 which is formed at the upper end of the tree bore 14. In this example, a protective cover such as a debris cap 16 is connected to the top of the tree 10 in order to prevent debris from falling into the tree bore 14. As shown in FIG. 1, the debris cap 16 is sealed to the top of the tree 10 using a face seal 18, which is typically made of a compliant material. However, the face seal 18 does not always prevent seawater in the tree bore 14 from contacting the sealing profile 12. As a result, contaminants such as marine growth and calcareous deposits may form on the sealing profile 12 and prevent a gasket which is used to seal the tree 10 to another component, such as a BOP, from forming an effective seal with the sealing profile.

According to the present disclosure, a sealing profile protector is provided which functions to displace seawater from a sealing profile to thereby inhibit contaminants such as marine growth and calcareous deposits from forming on the sealing profile. For purposes of simplicity, an embodiment of the sealing profile protector will be described in the context of the tree 10 and the sealing profile 12 described above in connection with FIG. 1. However, persons of ordinary skill in the art will readily appreciate how the teachings of the present disclosure can be applied to make a sealing profile protector which is suitable for use with other types of subsea production, injection or processing system components comprising other sealing profiles.

Figure 2:
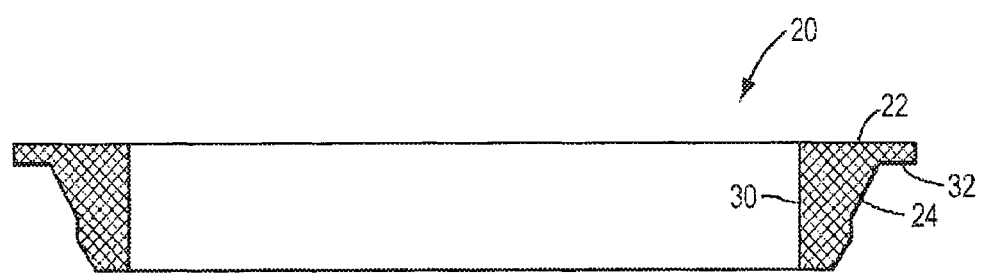
FIG. 2 is a cross sectional view of one embodiment of the sealing profile protector of the present disclosure.
Figure 3:
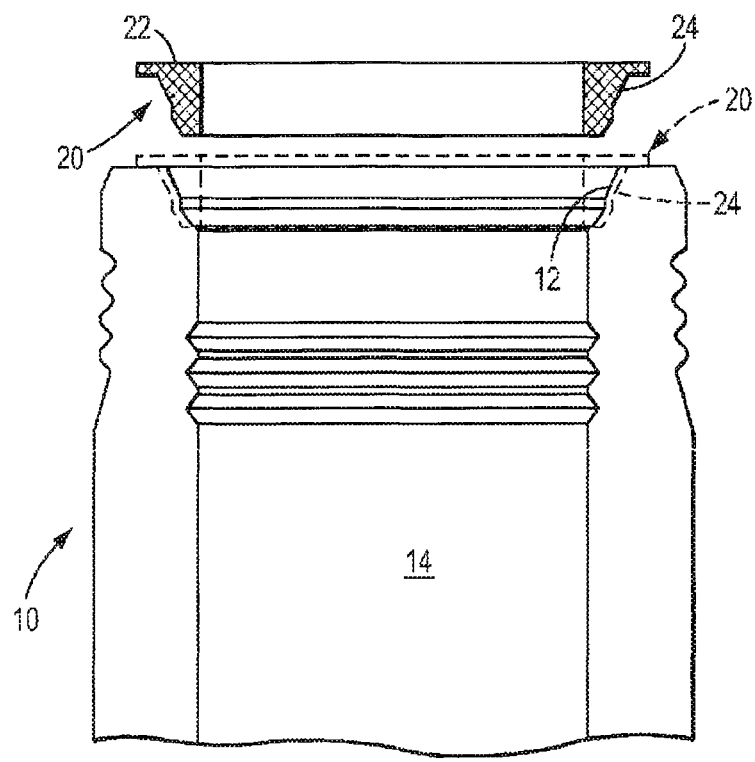
FIG. 3 is a cross sectional view of the sealing profile protector of FIG. 2 shown prior to being installed in the christmas tree of FIG. 1.
Figure 4:
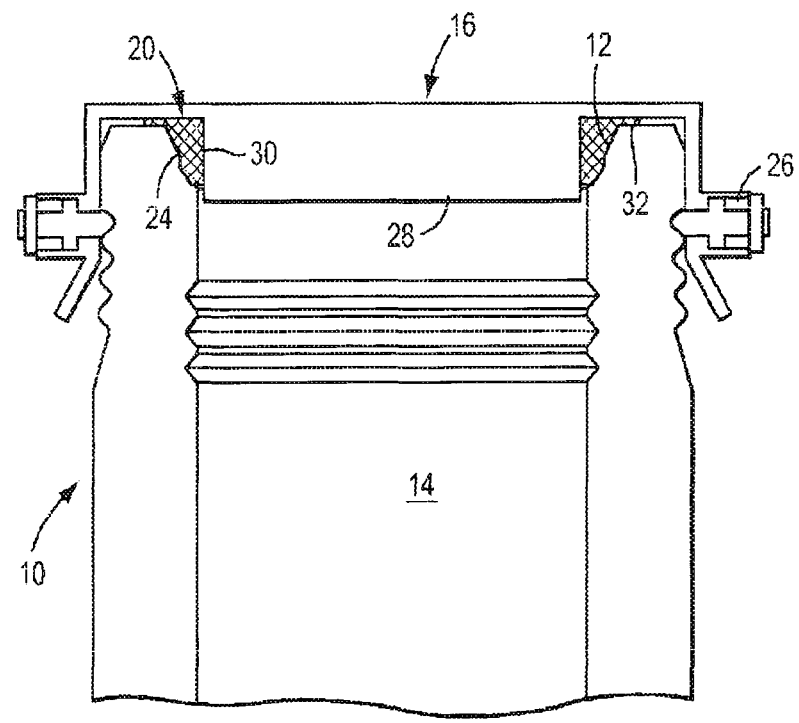
FIG. 4 is a cross sectional view of the sealing profile protector of FIG. 2 shown fully installed in the christmas tree of FIG. 1.

Referring to FIGS. 2-4, one embodiment of the sealing profile protector of the present disclosure, which is indicated generally by reference number 20, includes a circular body 22 that comprises an annular contact surface 24 which is configured to engage the particular sealing profile for which the sealing profile protector is designed. As shown in FIG. 3, for instance, the contact surface 24 is formed on the radially outer circumference of the body 22 and is accordingly configured to engage a radially inwardly-directed sealing profile such as the sealing profile 12 on the tree 10. However, the contact surface 24 may alternatively be configured to engage a radially outwardly-directed sealing profile on a subsea production, injection or processing system component. Also, although the sealing profile 12 is located proximate the upper end of the tree 10, the contact surface 24 may be configured to engage a sealing profile that is not located proximate an end of the subsea production, injection or processing system component.

In accordance with an embodiment of the present disclosure, the contact surface 24 is configured to form an interference fit with the sealing profile. As shown in phantom in FIG. 3, for example, when the contact surface 24 is in its initial state (i.e., prior to the sealing profile protector 20 being installed in the tree 10), the contact surface comprises an outer diameter that is larger than the diameter of the sealing profile 12. Although in this example the outer diameter at each axial position on the contact surface 24 is larger than the inner diameter at each corresponding axial position on the sealing profile 12, this need not be the case. Moreover, in contrast to what is shown in FIG. 3, when the contact surface 24 is in its initial state it need not even be configured to follow the contour of the sealing profile 12. Instead, the contact surface 24 need only be configured to substantially fill the contours of the sealing profile 12 when the sealing profile protector 20 is in the fully installed position (FIG. 4). In the case of the sealing profile 12, for example, the contact surface 24 may converge linearly from top to bottom as long as the contact surface substantially fills the contours of the sealing profile 12 when the sealing profile protector 20 is in the fully installed position.

The body 22 of the sealing profile protector 20 may be made of any suitable material. For example, the body 22 may be made of a non-metallic material such as plastic or rubber. Where the contact surface 24 is configured to form an interference fit with its corresponding sealing profile, the body 22, or at least that portion of the body 22 on which the contact surface is formed, is ideally made of a compliant material, such as plastic or rubber, or a combination of both plastic and rubber. In one embodiment, the body 22 is made of an open cell silicone foam. Also, the body 22 may be made using any appropriate technique; for example, it may be continuously molded, spliced, machined or printed.

As shown in FIG. 4, the sealing profile protector 20 may be retained in position in the sealing profile 12 using a protective cover 16. The protective cover 16 may comprise any suitable device which is configured to be retained in position on the tree 10, such as a debris cap, a temporary abandonment cap or a tree cap. In the embodiment shown in FIG. 4, the protective cover is secured to the tree 10 using a conventional locking mechanism 26. The sealing profile protector 20 may be formed integrally with the protective cover 16 or connected to the protective cover using, e.g., a suitable adhesive. In this illustrative embodiment, the protective cover 16 comprises an axial mandrel 28. For this reason, the sealing profile protector 20 is provided with an axial opening 30 through which the mandrel 26 can extend. Also, if as shown in FIG. 4 the locking mechanism 26 is designed such that the protective cover 16 is spaced apart from the top of the tree 10, the sealing profile protector 20 may be provided with a radial flange 32 that is configured to fill the space between the protective cover and the body 22.

The sealing profile protector 20 is installed in the sealing profile 12 by inserting the body 22 into the top of the tree bore 14 using, e.g., an ROV or an appropriate running tool. If the sealing profile protector 20 is used by itself, the body 22 may be inserted into the sealing profile 12 until, e.g., the flange 32 engages the top of the tree 10. The protective cover 16 may then be installed on the tree 10 to compress the contact surface 24 against the sealing profile 12 (if the contact surface is configured to form an interference fit with the sealing surface) and secure the sealing profile protector 20 in position in the tree. If, however, the sealing profile protector 20 is connected to the protective cover 16 beforehand, the sealing profile protector is installed into the sealing profile 12 by mounting the protective cover on the tree 10 and engaging the locking mechanism 26.

During installation of the sealing profile protector 20, the body 22 will displace the seawater from the sealing profile 12. If, for example, the contact surface 24 is configured to form an interference fit with the sealing profile 12, the contact surface will sweep the seawater away from the sealing profile as the sealing profile protector is inserted into the tree 10. Thereafter, once the sealing profile protector 20 is fully installed in the tree, the contact surface 24 will prevent the seawater from circulating around the sealing profile 12. In this manner, the sealing profile protector 20 will form an effective covering which will prevent seawater from contacting the sealing profile 12 and thereby inhibit contaminants such as marine growth and calcareous deposits from forming on the sealing profile.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A sealing profile protector for a subsea system component which includes a sealing profile, the sealing profile protector comprising:
   a body which comprises an annular contact surface that is configured to engage the entire sealing profile;
   wherein the contact surface is configured such that when the sealing profile protector is installed, the contact surface displaces seawater from the entire sealing profile;
   whereby contaminants are inhibited from forming on the sealing surface after the sealing profile protector is installed.

2. The sealing profile protector of claim 1, wherein the contact surface is configured to form an interference fit with the entire sealing profile.

3. The sealing profile protector of claim 2, wherein the body comprises a portion on which the contact surface is formed, and wherein at least the portion of the body is made of a compliant material.

4. The sealing profile protector of claim 1 or 3, wherein the body comprises a portion on which the contact surface is formed, and wherein at least the portion is made of an open cell silicone foam.

5. The sealing profile protector of claim 1, wherein the sealing profile is formed proximate an upper end of the component and the body is connected to or formed integrally with a cap member that is configured to be connected to the upper end of the component.

6. The sealing profile protector of claim 5, wherein the contact surface is configured to form an interference fit with the entire sealing profile.

7. The sealing profile protector of claim 6, wherein the body comprises a portion on which the contact surface is formed, and wherein at least the portion of the body is made of a compliant material.

8. The sealing profile protector of claim 5 or 7, wherein the body comprises a portion on which the contact surface is formed, and wherein at least the portion is made of an open cell silicone foam.

9. The sealing profile protector of claim 1, wherein the sealing profile is formed on a radially inner surface of the component and the contact surface is formed on an outer circumference of the body.

10. The sealing profile protector of claim 9, wherein the body is connected to or formed integrally with a cap member which configured to be connected to an upper end of the component.

11. The sealing profile protector of claim 10, wherein the contact surface is configured to form an interference fit with the entire sealing profile.

12. The sealing profile protector of claim 11, wherein the body comprises a portion on which the contact surface is formed, and wherein at least the portion of the body is made of a compliant material.

13. The sealing profile protector of claim 9 or 12, wherein the body comprises a portion on which the contact surface is formed, and wherein at least the portion is made of an open cell silicone foam.

14. In a subsea system which comprises a component having an annular sealing profile, the sealing profile being formed on a radially inner surface portion of the component, and the radially inner surface portion being located proximate an end of the component, the improvement comprising a sealing profile protector which includes:
   a circular body which comprises an annular contact surface that is configured to engage the entire sealing profile;

wherein the contact surface is configured such that when the sealing profile protector is installed, the contact surface displaces seawater from the entire sealing profile;

whereby contaminants are inhibited from forming on the sealing surface after the sealing profile protector is installed.

15. The subsea system of claim 14, wherein the body comprises a ring-shaped configuration.

16. The subsea system of claim 14, wherein the body is connected to or formed integrally with a cap member.

17. The subsea system of claim 14, wherein the contact surface is configured to form an interference fit with the entire sealing profile.

18. The subsea system of claim 17, wherein the body comprises a portion on which the contact surface is formed, and wherein at least the portion of the body is made of a compliant material.

19. The subsea system of claim 14 or 18, wherein the body comprises a portion on which the contact surface is formed, and wherein at least the portion is made of an open cell silicone foam.

20. A method for protecting a sealing profile of a subsea production or processing system component from seawater, the method comprising:

providing a sealing profile protector which comprises an annular contact surface that is configured to engage the entire sealing profile; and installing the sealing profile protector to thereby displace seawater from the entire sealing profile.

21. The method of claim 20, wherein the sealing profile protector is connected to or formed integrally with a protective cover for the component, and wherein the installing step comprises mounting the protective cover on the component.

22. The method of claim 20 or 21, wherein the sealing profile protector comprises a portion on which the contact surface is formed, and wherein at least the portion is made of an open cell silicone foam.

* * * * *